Dec. 18, 1945. J. C. BRYAN 2,391,005
ELECTRIC MOTOR
Filed July 1, 1941 2 Sheets-Sheet 2
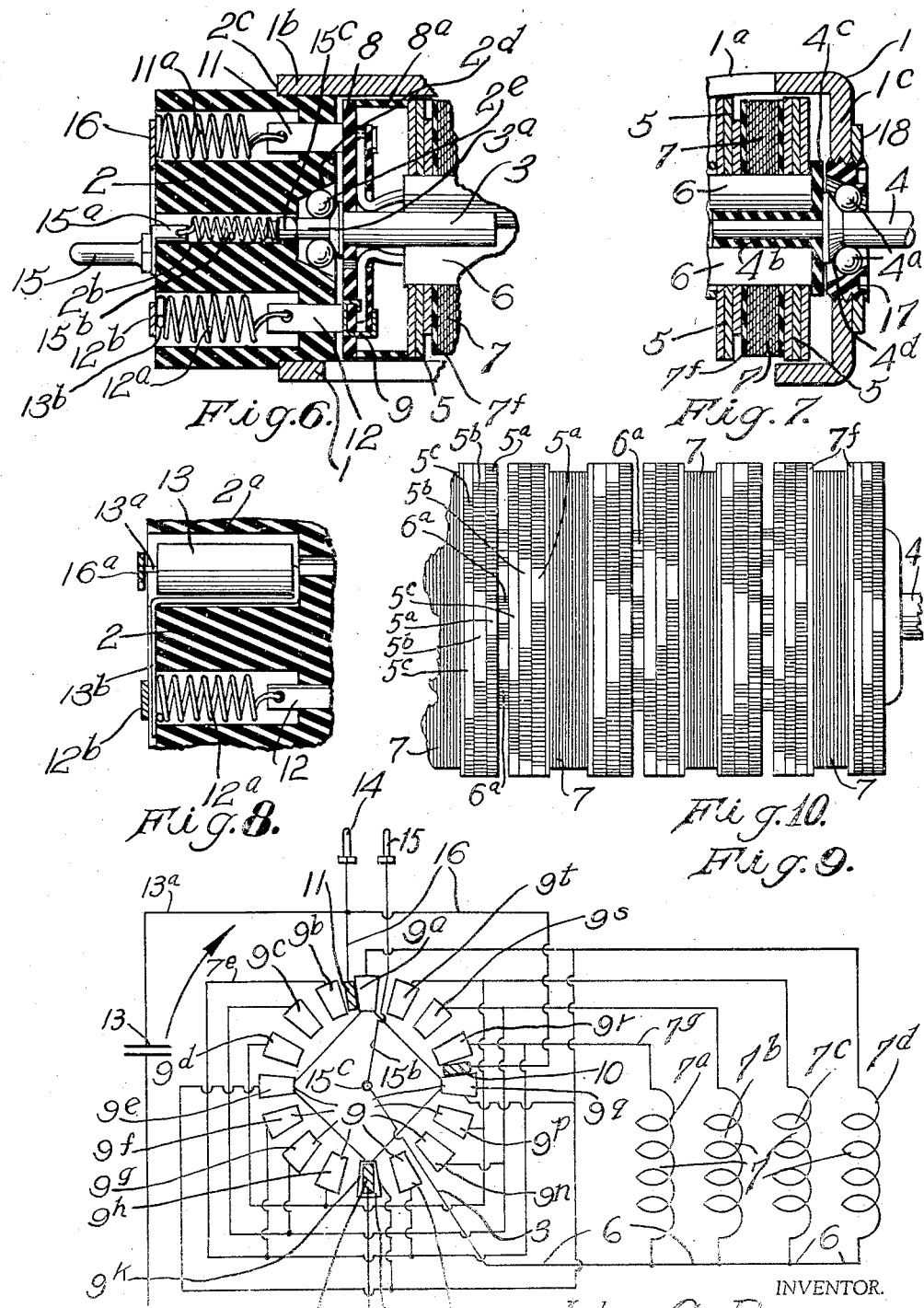
INVENTOR.
John C. Bryan
ATTORNEY.

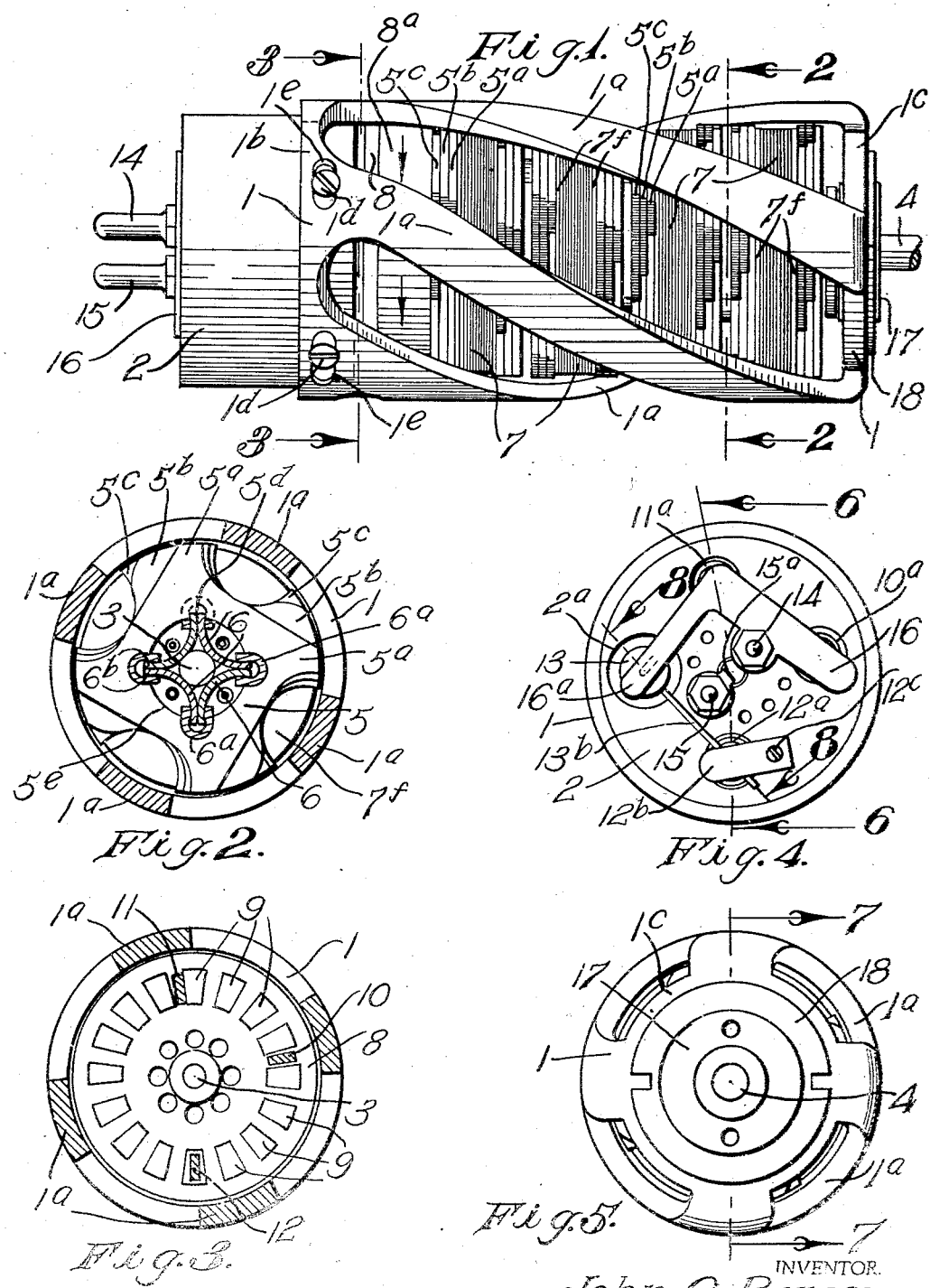

Patented Dec. 18, 1945

2,391,005

UNITED STATES PATENT OFFICE 2,391,005

ELECTRIC MOTOR

John C. Bryan, La Canada, Calif.

Application July 1, 1941, Serial No. 400,597

12 Claims. (Cl. 172—36)

My invention relates to electric motors of the attraction type and of the type that has no field winding as distinguished from the conventional type of motor and the objects of my invention are:

First, to provide an electric motor which provides an exceptionally high torque relatively to the conventionally field wound magnetic type motor;

Second, to provide an electric motor which provides exceptionally high torque relatively to the conventionally field wound magnetic type motor of equivalent bulk, particularly at low speed;

Third, to provide an electric motor of this class which operates relatively efficiently at low speed;

Fourth, to provide an electric motor of this type which provides a relatively high starting torque;

Fifth, to provide an electric motor of this class which is so constructed and arranged that various speed specifications may be attained without a material increase in bulk;

Sixth, to provide an electric motor of this class with inherently cool running characteristics;

Seventh, to provide an electric motor of this class which has a magnetic path arrangement which provides high efficiency relatively to conventionally field wound magnetic type motors;

Eighth, to provide an electric motor of this class which is very simple of construction and economical to manufacture;

Ninth, to provide an electric motor of this class which has a slender magnetic path, thus reducing the eddy currents and therefore it is not necessary to be particular in the selection of construction materials;

Tenth, to provide an electric motor of this class which eliminates the field windings;

Eleventh, to provide an electric motor of this class in which units may be easily added to or taken from to provide for various purposes for which the motor is to be used;

Twelfth, to provide an electric motor of this class in which a condenser may be used effectively and to distinct advantage in operation;

Thirteenth, to provide an electric motor of this class with quick acting reversing characteristics resulting from its high starting torque and consequent braking effect; and Fourteenth, to provide an electric motor of this class that may be brought to a stop under load and electrically locked against further movement without injury to the motor;

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereof which form a part of this application in which:

Figure 1 is a side elevational view of my electric motor; Fig. 2 is a transverse sectional view taken from the line 2—2 of Fig. 1; Fig. 3 is a transverse sectional view taken from the line 3—3 of Fig. 1; Fig. 4 is an end view of my electric motor; Fig. 5 is an end view of my electric motor showing the opposite end thereof from that as shown in Fig. 4; Fig. 6 is a fragmentary longitudinal sectional view taken from the line 6—6 of Fig. 4; Fig. 7 is a fragmentary longitudinal sectional view taken from the line 7—7 of Fig. 5; Fig. 8 is a fragmentary longitudinal sectional view taken from the line 8—8 of Fig. 4; Fig. 9 is a diagrammatic view of the wiring of my electric motor, and Fig. 10 is a fragmentary side elevational view of the rotor.

Similar characters of reference refer to similar parts and portions throughout the several views of the drawings:

The main frame 1, casing 2, motor shaft members 3 and 4, segments 5, segment supporting shaft members 6, solenoid coils 7, contact member supporting plate 8, contact members 9, contact brushes 10 and 11, condenser brush 12, condenser 13, electrical connection members 14 and 15, electrical conductor plate 16, shaft bearing member 17 and the bearing lock nut 18 constitute the principal parts and portions of my electric motor.

The main frame 1 is substantially cylindrical in form and is hollow, as shown best in Fig. 2 of the drawings, for encasing the rotor mechanism of my electric motor. This main frame 1 is provided with spaced field strips 1a, as shown best in Figs. 1 and 2 of the drawings. These spaced field strips 1a are helically disposed in relation with the longitudinal axis of my electric motor, as shown best in Fig. 1 of the drawings. The open spaces intermediate the field strips 1a and the helical disposition of these field strips 1a provides for circulation of air about the rotor mechanism of my electric motor whereby a cool running condition of my electric motor is maintained at all times.

The main frame 1 is provided with a straight open end portion 1b at its one end and a partially enclosed end portion 1c at its other end, as shown best in Figs. 1 and 5, respectively. Screw threaded in the partially enclosed end portion 1c is the shaft bearing member 17, as shown best in Fig. 7 of the drawings. This shaft bearing 17 is made of electrical insulation material and is provided with a lock nut 18 screw threaded on the outer side thereof and arranged to engage the outer side of the end portion 1c of the main casing 1, as shown best in Figs. 5 and 7 of the drawings. Positioned in the open end portion 1b of the main frame 1 is the casing 2. This casing 2 is cylindrical in form and is made of electrical insulation material, as shown best in Figs. 1, 4 and 6 of the drawings.

Positioned in this casing 2 are the contact brushes 10 and 11 and the condenser brush 12, together with the condenser 13, all as shown best in Figs. 4, 6 and 8 of the drawings.

As shown in Fig. 6 of the drawings the contact brush 11 and the condenser brush 12 are each reciprocally mounted in the casing 2 and in connection with compression springs 11a and 12a respectively which force the contact brush 11 and the condenser brush 12 into engagement with the contacts 9 on the contact member supporting plate 8. The contact brush 10 is connected with a compression spring 10a, as shown in Fig. 4 of the drawings in similar relation to the contact brush 11 in connection with the compression spring 11a, as shown in Fig. 6 of the drawings. These compression springs 10a and 11a in connection with the contact brushes 10 and 11 are held in compression at the outer side of the casing 2 by means of the electrical conductor plate 16 which is connected with the electrical connection member 14, as shown best in Fig. 4 of the drawings. This electrical connection member 14 is screw-threaded in the casing 2 and holds the electrical conductor plate 16 in secure relation with the casing 2. The electrical conductor plate 16 is L-shaped and is provided with an extending portion 16a which engages the conductor wire 13a at one end of the condenser 13, as shown best in Fig. 8 of the drawings. The condenser 13, as shown in Fig. 8 of the drawings, is positioned in a recess portion 2a of the casing 2. The condenser 13 is provided with an electric conductor wire 13b which extends to the spring 12a in connection with the condenser brush 12, as shown best in Figs. 4 and 8 of the drawings. Positioned over this electrical conductor 13b and the compression spring 12a is a plate member 12b. This plate member 12b is secured to the casing 2 by means of the screw 12c, all as shown best in Figs. 4, 6 and 8 of the drawings.

Secured to the casing 2 in screw-threaded relation therewith and in spaced relation with the electrical connection member 14 is the electrical connection member 15, as shown best in Figs. 1 and 4 of the drawings. Connected with this electrical connection member 15 is a conductor member 15a which extends inwardly into a central opening 2b of the casing member 2. Connected with the electrical conductor 15a is a compression spring 15b which engages an electrical brush 15c in connection with the outer end of the motor shaft member 3 at its end portion 3a, as shown best in Fig. 6 of the drawings. The casing 2 is provided with an annular shoulder portion 2c which engages the end of the main frame 1, as shown best in Fig. 6 of the drawings. The casing 2 projects inwardly of the shoulder portion 2c inside the end portion 1b of the main frame 1, as shown best in Figs. 1 and 6 of the drawings. The casing 2 is secured to the end portion 1b of the main frame 1 by means of the screws 1d which extend through slotted openings 1e in the end portion 1b of the main frame 1 and are screw threaded in the casing 2, all as shown best in Fig. 1 of the drawings.

It will be noted that the casing 2 is provided with an internal bearing race portion 2d in which are positioned the ball bearings 2e which support the end portion 3a of the motor shaft member 3, as shown best in Fig. 6 of the drawings. The motor shaft 4, at the opposite end of my electric motor from the motor shaft member 3 is supported by the ball bearings 4a in the shaft bearing member 17, as shown best in Fig. 7 of the drawings.

The segment supporting shaft members 6 are supported at their opposite ends on the motor shaft members 3 and 4, as shown best in Figs. 6 and 7 of the drawings. These segment supporting shaft members are made of metal and are arcuate in cross section, as shown in Fig. 2 of the drawings. These segment supporting shaft members 6 are in the form of quadrants as shown in cross section in Fig. 2 of the drawings and are arranged in tangent relation with each other at their opposite edges. Positioned over the adjacent tangent edges of these segment supporting shaft members 6 are clip-shaped spacer members 6a. These spacer members 6a are provided with extending portions 6b which are positioned inside the segments 5, as shown best in Fig. 2 of the drawings, it being here noted that one of these spacer members 6a is partially broken away to illustrate the extending portions 6b. The adjacent tangent edges of the segment supporting shaft members 6 extend into notched portions 5d of the segments 5, as shown best in Fig. 2 of the drawings providing a rigid connected relation of the segments 5 with the segment supporting shaft members 6. It will be noted that the segments 5 are longitudinally shiftable on the segment supporting shaft member 6 for readily assembling the segments 5 on the segment supporting shaft members 6. As shown in Fig. 2 of the drawings the adjacent edges of the four segment supporting shaft members 6 form four rectangularly disposed edges on which the segments 5 are supported.

As shown in Fig. 6 of the drawings, the motor shaft member 3 is pressed into engagement with the segment supporting shaft member 6 intermediate the four segment supporting shaft members 6. These segment supporting shaft members 6 are preferably of electrical conducting material and the motor shaft member 3 is in electrical connection with the segment supporting shaft members 6, all as shown best in Figs. 2 and 6 of the drawings. Positioned in connection with the opposite end of the segment supporting shaft member 6 is an insulation member 4b. This insulation member 4b is positioned intermediate the segment supporting shaft members 6 in substantially the relation as is the motor shaft member 3. This insulation member 4b is hollow and pressed therein is the motor shaft member 4, as shown best in Fig. 7 of the drawings. It will be here noted that the insulation member 4b is provided with an annular flange portion 4c which forms an abutment for the bearing race portion 4d of the motor shaft 4, all as shown best in Fig. 7 of the drawings.

The segments 5 are supported on the segment supporting shaft members 6 in substantially the relation as hereinbefore described and each of these segments 5 is provided with three plate-like segment portions 5a, 5b and 5c. The segment portion 5c is relatively broad, as shown in Fig.

2 of the drawings and the segment 5b is arranged in stepped relation therewith and is narrower, while the segment portion 5a is narrower than the segment portion 5b at its adjacent extending end portions relatively with the segment portions 5b and 5c. Each of these segments 5 is provided with four radially extending portions which is graduated in form by the segment portions 5a, 5b and 5c, all as shown best in Fig. 2 of the drawings.

It will be here noted that each of the segments 5 is provided with a relatively large internal opening 5e providing a space outwardly of each of the segment supporting shaft members 6 for the disposition of electric wires in connection with the solenoid coils 7. The solenoid coils 7 are annular coils of wire and are positioned intermediate the segments 5, as shown best in Fig. 7 of the drawings. Positioned intermediate the solenoid coils 7 and the segments at opposite sides thereof are insulation plates 7f as shown best in Fig. 7 of the drawings. The solenoid coils 7 are each in electrical connection with the segment supporting shaft members 6 at one end and with the electric contacts 9 at the other end.

The contact members 9 are rigidly connected with the contact member supporting plate 8. This contact supporting plate 8 is an annular flat plate-like member made of electrical insulation material and is secured in connection with the motor shaft 3 and the segments 5, as shown best in Fig. 6 of the drawings. This contact member supporting plate 8 is provided with an annular band-like member 8a which is made of insulation material and interconnects said contact member supporting plate 8 and the segments 5 at the one end of the segment supporting shaft members 6, as shown in Fig. 6 of the drawings. The contact members 9 are disposed on the contact member supporting plate 8 and secured thereon in an annular row, as shown best in Fig. 3 of the drawings. The contact members 9 are made of metal or other suitable electrical conducting material and are secured in flush relation with one side of the contact member supporting plate 8, as shown best in Fig. 6 of the drawings.

Electrically connected to these contact members 9 are electrical conductor wires, as shown best in Fig. 6 and in the diagrammatic view of the wiring in Fig. 9 of the drawings. These electrical conductor wires in connection with the contacts 9 are connected with the solenoid coils 7.

As shown in Fig. 3 of the drawings, the contact brushes 10 and 11 are disposed at substantially 90° to each other in relation with the axis of the motor shaft member 3. The contact brushes 10 and 11 are so positioned within the casing 2 relatively with the condenser brush 12 that the condenser brush 12 makes direct contact with one of the contacts 9 while the contact brushes 10 and 11 are positioned in slight spaced relation from the edges of the contacts 9, adjacent said brushes 10 and 11, all as shown best in Fig. 3 of the drawings.

The operation of my electric motor is substantially as follows:

Referring to Fig. 9, the diagrammatic view of the wiring, it will be observed that there are sixteen of the contact members 9 in my electric motor in this particular arrangement thereof. There are also four of the solenoid coils 7, as shown. Four of the contacts 9 are connected to each coil 7 and these four contacts are spaced 90° from each other. Therefore, it will be obvious that each of the four coils 7 receive four electrical impulses through the contacts 9 during one revolution of the rotating mechanism of my electric motor. As the annular row of contacts 9 revolve in relation with the contact brushes 10 and 11, the coils 7a, 7b, 7c and 7d are consecutively energized causing magnetic flux to be set up in the segments 5 as shown in Fig. 7 at opposite sides of each of these coils 7a, 7b, 7c and 7d as shown best in Fig. 10. This magnetic flux urges the radially extending portions of the segments 5 as shown in Figs. 1 and 10 toward the field strips 1a of the main frame 1. The main frame 1 is provided with four spaced field strips 1a, as shown in Fig. 2 of the drawings and these four field strips 1a cooperate with the four radially extending portions of each of the segments 5 when the segments 5 are energized by the coil 7.

It will be here noted that the extending segment portions of the segments at opposite sides of each of the coils 7 are in angularly offset relation to each other to correspond to the helical angle of each of the field strips 1a for conforming operative relation therewith. Each of the coils 7 energizes a pair of segments 5. The extending portions of the pairs of segments 5 are substantially parallel with the axis of my electric motor whereby adjacent pairs of segments are consecutively energized by the coil 7 in conforming relation with the helical angle of the field strips 1a. The coils 7 are each consecutively energized one after the other four times with each revolution of the rotating mechanism of my electric motor as follows:

As shown in Fig. 9 of the drawings, the contact brushes 10 and 11 operate as one and are arranged to provide efficient dual contacts in a common circuit to each other.

The contact brushes 10 and 11 are electrically connected to the electrical connection member 14 by means of the electrical conductor plate 16. The condenser 13 is also electrically connected to the electrical conductor plate 16 by the wire conductor 13a. In connection with the condenser 13 in opposed relation with the wire conductor 13a is the wire conductor 13b. This wire conductor 13b is connected with the condenser brush 12.

The contacts 9b, 9f, 9m and 9r are all electrically connected together with the coil 7a. The contact 9c, 9g, 9n and 9s are all electrically connected together and with the coil 7b. The contacts 9d, 9h, 9p and 9t are all electrically connected together and with the coil 7c. The contacts 9a, 9e, 9k and 9q are all electrically connected together and with the coil 7d. As the contact member supporting plate 8 rotates relatively with the contact brushes 10 and 11 and the condenser brush 12, the contacts 9 consecutively engage the same.

Assuming that the contact brushes 10 and 11 engage the contacts 9b and 9r respectively, the current passing through the electrical connection member 14 and the electrical conductor plate 16 is transmitted to the coil 7a through the conductor 7e and 7g. The circuit is completed through the coil 7a and the segment supporting shaft members 6 in connection with the motor shaft 3 and the brush 15c which is in electrical connection with the electrical connection member 15.

It will be here noted that the electrical connection members 14 and 15 connect with the conventional power line lead wires or conductors.

As the contact brushes 10 and 11 are passed by the contacts 9b and 9r, the contact is broken setting up an induced current in the coil 7a which is transmitted to the condenser 13 by the wire 13b in connection with the condenser brush 12 which is in contact with contact 9m. When the induced current is transmitted to the condenser 13 by the condenser brush 12 after the passage of the contacts 9b and 9r relatively with the contact brushes 10 and 11, the induced current is discharged from the condenser 13 through the wire 13a and the contact brushes 10 and 11 to the next oncoming contacts 9c and 9s with increased energization of the coil 7b in connection therewith.

The relative arrangement of the condenser brush 12 with the contact 10 and 11 is such that the condenser brush 12 engages one of four connected contacts 9, while the contact brushes 10 and 11 break contact with two of said four connected contacts, whereby the condenser brush 12 receives the induced current set up by the contact brushes 10 and 11 when they break contact with the contacts 9. Therefore, as each contact is broken, induced current is collected by the condenser brush 12 and transmitted to the condenser 13 from which induced current is utilized by the contact brushes 10 and 11 in relation with the consecutive passage of the contacts 9 past the contact brushes 10 and 11.

It will be noted that there is continuous progress from one of the coils 7 to the next for consecutively energizing the segments 5 which are magnetically urged toward the field strips 1a causing rotation of the rotating mechanism of my electric motor.

The amount of rotation of the rotating mechanism for each cycle of consecutive energization of the coil 7 is ninety per cent with respect to the outer field strips 1a.

When the contact brushes 10 and 11 engage any one of the contacts 9b, 9f, 9m or 9r, the coil 7a will be energized. It is therefore obvious that this coil 7a will be energized four times at each revolution of the contact member supporting plate 8 relatively with the contact brushes 10 and 11. When the contact brushes 10 and 11 engage any one of the contacts 9c, 9g, 9f or 9s, the coil 7b will be energized. It will be noted that each of the coils 7a, 7b, 7c and 7d is connected with the segment supporting shaft member 6 in electrical connection with the shaft member 3 which is engaged by the brush 15c in electrical connection with the electrical connection member 15. The opposite ends of each of the coils 7 from the segment supporting shaft members 6 are separately connected to four of the contacts 9 which are arranged in cooperative relation with the four radially extending portions of each of the segments 5 together with the four field strips 1a of the main frame 1.

It will be here noted that the operating principle of my electric motor would not be altered if a greater or lesser number of segments and coils or field strips were used in the construction of the same.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an electric motor of the class described, a plurality of spaced helically disposed field members and a plurality of variously arranged segments provided with portions extending into close proximity with said field members, a plurality of solenoids in electro-magnetic relation with said field members and said segments, the winding of said solenoids being concentric with the axis of said motor.

2. In an electric motor of the class described, a plurality of spaced helically disposed field members and a plurality of variously arranged segments provided with portions extending into close proximity with said field members, a plurality of solenoids in electro-magnetic relation with said field members and said segments, the winding of said solenoids being concentric with the axis of said motor, and a commutator in operative relation with said solenoids and segments.

3. In an electric motor of the class described, a plurality of spaced helically disposed field members, a plurality of variously arranged segments provided with portions extending into close proximity with said field members, a plurality of solenoids in electro-magnetic relation with said field members and said segments, the winding of said solenoids being concentric with the axis of said motor, a commutator in operative relation with said solenoids and segments, and a contact brush supported by said field members in cooperative relation with the contact of said commutator.

4. In an electric motor of the class described, a plurality of spaced helically disposed field members and a plurality of variously arranged segments provided with portions extending into close proximity with said field members, a plurality of solenoids in electro-magnetic relation with said field members and said segments, the winding of said solenoids being concentric with the axis of said motor, a commutator in operative relation with said solenoids and segments, a contact brush supported by said field members in cooperative relation with the contact of said commutator and means for adjusting the position of said brush relative to the contact of said commutator.

5. In an electric motor of the class described, a shaft, a frame member including helically disposed field members surrounding said shaft, a plurality of solenoids surrounding said shaft and a plurality of segments positioned in spaced relation relatively to said field members and relatively to each other.

6. In an electric motor of the class described, a shaft, a frame member including helically disposed field members surrounding said shaft, a plurality of solenoids surrounding said shaft, and a plurality of segments positioned in spaced relation relatively to said field members and relatively to each other, one segment positioned on each opposite side of each of said solenoids.

7. In an electric motor of the class described, an armature including units of solenoids cylindrically wound concentric with the longitudinal axis of the motor, segment members positioned radially around said shaft with respect to each other so that they are periodically attracted rotationally and helically disposed field members in close proximity to the periphery of said segments.

8. In an electric motor of the class described, an armature including units of solenoids cylindrically wound concentric with the longitudinal axis of the motor, segment members positioned radially around said shaft with respect to each other so that they are periodically attracted rotationally and helically disposed field members in close proximity to the periphery of said segments, and a commutator in cooperative relation with said segments and said field members.

9. In an electric motor of the class described, a plurality of spaced field members, a plurality of variously arranged segments provided with portions extending into close proximity with said field member, a plurality of solenoids in electro-magnetic connection with said field members and said segments, the winding of said solenoids being concentric with the axis of said motor, and a shaft for said segments including a plurality of members, each member being arcuate in cross section and said members positioned in tangential relation near their edges.

10. In an electric motor of the class described, a plurality of spaced field members and a plurality of variously arranged segments provided with portions extending into close proximity with said field member, a plurality of solenoids in electro-magnetic connection with said field members and said segments, the winding of said solenoids being concentric with the axis of said motor, a shaft for said segments including a plurality of members, each member being arcuate in cross section and said members positioned in tangential relation near their edges, the adjacent edges of said arcuate in cross section members positioned in connection with said segments.

11. In an electric motor of the class described, a plurality of spaced field members, a plurality of variously arranged segments provided with portions extending into close proximity with said field members, a plurality of solenoids in electro-magnetic connection with said field members and said segments, the winding of said solenoids being concentric with the axis of said motor, a commutator in operative relation with said solenoids and segments including a contact brush, a condenser brush arranged to receive induced current set up when an electrical contact has been broken by said contact brush, and a condenser connected with said condenser brush and said contact brush.

12. In an electric motor of the class described, the combination of a hollow main frame provided with spaced strip field portions, a shaft for said motor supported in the opposite end of said main frame member, solenoid coils wound on said shaft concentrically therewith, segments adjacent said coils extending radially into close proximity to said spaced strip field portions, a commutator in connection with said shaft and electrically connected with said solenoid coils, contact brushes for said commutator, a condenser brush in connection with said commutator and a condenser connecting said contact brush and said condenser brush for transmitting induced current set up when an electrical contact is broken by action of said commutator.

JOHN C. BRYAN.